United States Patent
Chang et al.

(10) Patent No.: US 7,580,487 B2
(45) Date of Patent: Aug. 25, 2009

(54) APPARATUS AND METHOD FOR ESTIMATING A CARRIER TO INTERFERENCE AND NOISE RATIO IN A COMMUNICATION SYSTEM

(75) Inventors: Jae-Hwan Chang, Suwon-si (KR); Yun-Sang Park, Suwon-si (KR); Bong-Gee Song, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 655 days.

(21) Appl. No.: 11/120,254

(22) Filed: May 2, 2005

(65) Prior Publication Data
US 2005/0265489 A1 Dec. 1, 2005

(30) Foreign Application Priority Data
May 27, 2004 (KR) .................. 10-2004-0037956

(51) Int. Cl.
*H03D 1/04* (2006.01)

(52) U.S. Cl. .............. 375/346; 375/340; 375/260; 375/222; 375/377; 327/310; 327/384; 327/551; 285/259; 285/284; 370/206; 370/210; 370/480

(58) Field of Classification Search ................ 375/346, 375/340, 260, 146–148, 222, 377, 140, 141; 370/206, 210, 480; 455/67.13, 67.11
See application file for complete search history.

(56) References Cited

U.S. PATENT DOCUMENTS 6,463,105 B1* 10/2002 Ramesh .................... 375/262
7,187,646 B2* 3/2007 Schramm .................. 370/206

FOREIGN PATENT DOCUMENTS

KR  10266601  6/2000

\* cited by examiner

*Primary Examiner*—Shuwang Liu
*Assistant Examiner*—Helene Tayong
(74) *Attorney, Agent, or Firm*—The Farrell Law Firm, LLP

(57) ABSTRACT

An apparatus and a method for estimating a carrier to interference and noise ratio (CINR) in a communication system. The CINR value is precisely estimated by removing the error floor value, which is caused by the inaccurate sliding average window SAW channel estimation value, from the CINR estimation value. Since the CINR value is precisely estimated, performance of the adaptive power control or the adaptive modulation and coding device is improved.

14 Claims, 6 Drawing Sheets

APPARATUS AND METHOD FOR ESTIMATING A CARRIER TO INTERFERENCE AND NOISE RATIO IN A COMMUNICATION SYSTEM

PRIORITY

This application claims priority to an application entitled "Apparatus and Method for Estimating Carrier to Interference and Noise Ratio in Communication System" filed in the Korean Intellectual Property Office on May 27, 2004 and assigned Serial No. 2004-37956, the contents of which are hereby incorporated by reference.

BACKGROUND OF THE INVENTION

1. Field of the Invention

The present invention relates generally to a mobile communication system, and more particularly to an apparatus and a method for estimating a carrier to interference and noise ratio (CINR), which is a basic factor for estimating reception performance of a communication system using an orthogonal frequency division multiplexing (OFDM) technique or an orthogonal frequency division multiple access (OFDMA) technique.

2. Description of the Related Art

As is generally known in the art, the OFDM technique is used to transmit high-speed data through wired/wireless channels. More specifically, the OFDM technique uses a plurality of carriers to transmit data while converting serial data into parallel data and modulating each of the parallel data into a plurality of sub-carriers having orthogonality, that is, sub-channels.

Recently, the OFDM technique has been widely used in various digital data transmission fields, such as digital/audio broadcastings, digital TVs, wireless local area networks (WLANs), wireless asynchronous transfer modes (WATM), and broadband wireless accesses (BWAs). Conventionally, the OFDM technique could not be used because it requires a complex hardware structure. However, as various digital signal processing technologies including fast Fourier transform (FFT) and inverse fast Fourier transform have been developed, the OFDM technique can be used in the various data transmission fields.

The OFDM technique is similar to the conventional frequency division multiplexing (FDM) technique. Among other things, the OFDM technique transmits data while maintaining orthogonality between sub-carriers, thereby obtaining an optimal transmission efficiency when transmitting high-speed data. In addition, the OFDM technique may achieve high frequency efficiency and represents a superior property against multi-path fading. Further, because the OFDM technique overlaps the frequency spectrums, the OFDM technique is resistive to frequency-selective fading and reduces interference between symbols by using guard intervals. In addition, in view of hardware, it is possible to simplify a structure of an equalizer while reducing impulse-derived noise.

In an OFDM/OFDMA (hereinafter, commonly referred to as "OFDM") system, channel signal quality, such as CINR (carrier to interference noise ratio), which is an essential parameter for an adaptive power control or adaptive modulation/coding, must be measured. According to the adaptive power control or an adaptive modulation/coding device, power or a modulation/coding level is controlled based on the quality of channels by using a CINR value. The CINR value is obtained by dividing a sum of signal powers of sub-carriers by a sum of interference power and noise. The CINR value is a basic factor for determining the quality of channels in an OFDM system.

If the channel is estimated using a sliding average window (SAW) in the OFDM system, power is defined by a square value of an absolute value of a SAW channel estimation value. Accordingly, total signal power is represented as a sum of square values of absolute values of SAW channel estimation values. In addition, if the SAW channel estimation value is subtracted from the receiving signal of each sub-carrier, only noise and an interference signal remain. Therefore, a sum of noise and interference power is represented as a sum of square values of absolute values of noise and interference values. Accordingly, in the OFDM system for estimating channels using the SAW, the CINR can be obtained by dividing the sum of square values of absolute values of SAW channel estimation values by the sum of noise and interference power.

However, the SAW channel estimation values are inaccurate values. Therefore, if the CINR estimation value is obtained using an inaccurate SAW channel estimation value, the CINR estimation value may be represented higher than a real CINR value, which is called an "error floor phenomenon". Therefore, it is difficult to precisely estimate the real CINR value.

In addition, such an inaccurate CINR value may deteriorate performance of the adaptive power control or the adaptive modulation/coding device.

SUMMARY OF THE INVENTION

An aspect of the present invention is to provide an apparatus and a method for precisely estimating a CINR by removing an error floor value by using an accurate SAW channel estimation value, from a CINR estimation value.

According to the present invention, there is provided a CINR estimation apparatus for use in a communication system. The CINR apparatus includes: a channel pass device for multiplying receiving signals by a predetermined sequence value and outputting channel pass signals; a channel estimator for calculating SAW channel estimation values using a SAW channel estimation method based on the channel pass signals; a CINR estimator for obtaining a total signal power using the SAW channel estimation values, for obtaining a total noise and interference power using noise and interference signal values, which are obtained by subtracting the SAW estimation values from the channel pass signals, and for calculating CINR estimation values using the total signal power and the total noise and interference power; and an error floor remover calculating an error function of the CINR estimation values through performing an inverse calculation for the CINR estimation values based on real channel pass signal values instead of using inaccurate SAW channel estimation values and removing an error floor caused by the error function of the CINR estimation values from the CINR estimation values calculated by the CINR estimator.

According to another aspect of the present invention, there is provided a method for estimating a CINR. The method includes the steps of calculating SAW channel estimation values using an SAW channel estimation method based on the channel pass signals obtained by multiplying receiving signals by a predetermined sequence value; calculating noise and interference signal values by subtracting the SAW estimation values from the channel pass signals; obtaining total signal power by using the SAW channel estimation values and total noise and interference power by using the noise and interference signal values; calculating CINR estimation values; calculating an error function of the CINR estimation values through performing an inverse calculation for the CINR estimation values based on real channel pass signal values instead of using inaccurate SAW channel estimation values; and removing an error floor, which is caused by the error function of the CINR estimation values, from the CINR estimation values.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Figure 1:
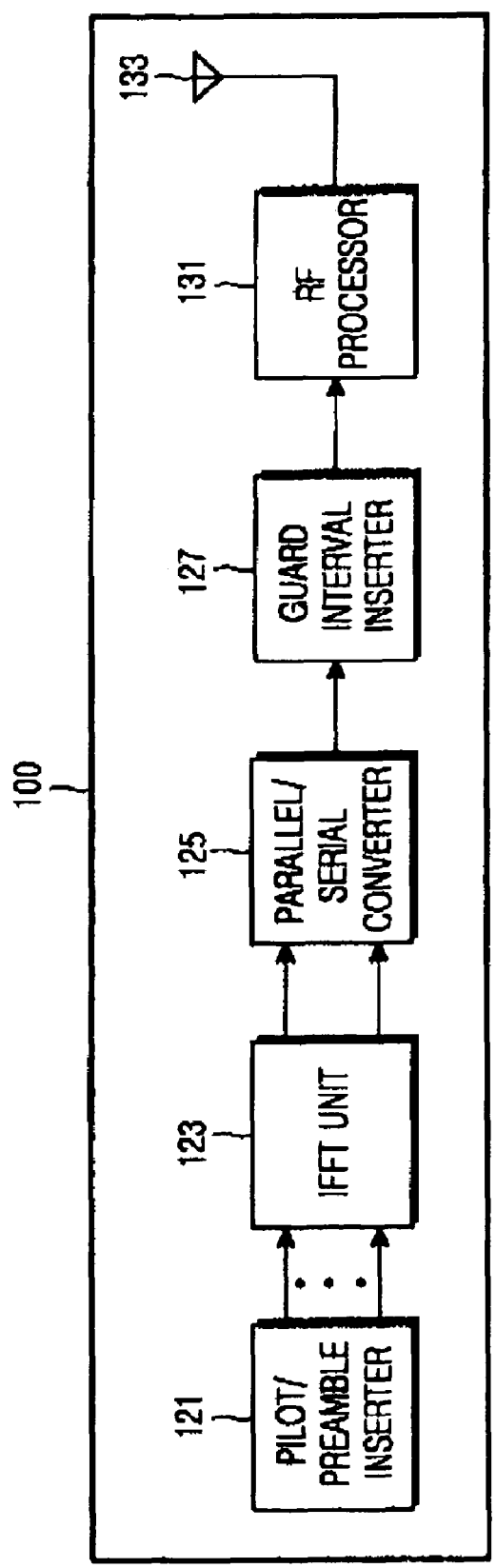
FIG. 1 is a block diagram illustrating a conventional OFDM transmitter.

Preferred embodiments of the present invention will be described in detail herein below with reference to the accompanying drawings. In the following description of the present invention, the same reference numerals are used to designate the same or similar components. Additionally, a detailed description of known functions and configurations incorporated herein will be omitted when it may obscure the subject matter of the present invention.

FIG. 1 is a block diagram illustrating a conventional OFDM transmitter 100. Referring to FIG. 1, the OFDM transmitter 100 includes a pilot/preamble inserter 121, an IFFT unit 123, a parallel/serial converter 125, a guard interval inserter 127, an RF processor 131, and an antenna 133. The pilot/preamble inserter 121 creates a plurality of sub-channels and pilot symbols (or preambles), which are set in an OFDM communication system, and inserts the pilot symbols into the sub-channels, that is, inserts the pilot symbols into data symbols. More specifically, the pilot symbols are inserted into the sub-channels through which the data symbols are transmitted for the purpose of channel estimation. The transmission position of pilot sub-channels is predetermined in the OFDM communication system.

In addition, the created preamble is mainly positioned in front of a frame in the form of an OFDMA symbol. However, pilots and preambles used in the preferred embodiments of the present invention use different sequences depending on the base station. Therefore, the present invention can be effectively realized if one base station is positioned orthogonally to the other base station. A pilot signal has a predetermined sequence and is assumed that it uses binary phase shift keying modulation. Accordingly, a pilot signal used in the present invention consists of a combination of complex number signals "1" and "−1".

An inverse fast Fourier transform (IFFT) unit 123 receives the sub-channels and performs inverse fast Fourier transform with respect to the sub-channels. The IFFT unit 123 outputs the sub-channels to the parallel/serial converter 125. The parallel/serial converter 125 converts parallel signals into serial signals and outputs the serial signals to the guard interval inserter 127. The guard interval inserter 127 inserts a guard interval into the serial signal in order to reduce inter-symbol interference (ISI) between sub-channels output from the IFFT unit 123 and outputs channel data to the RF processor 131.

Upon receiving channel data from the guard interval inserter 127, the RF processor 131 transmits the channel data into a wireless channel through the antenna 133.

Figure 2:
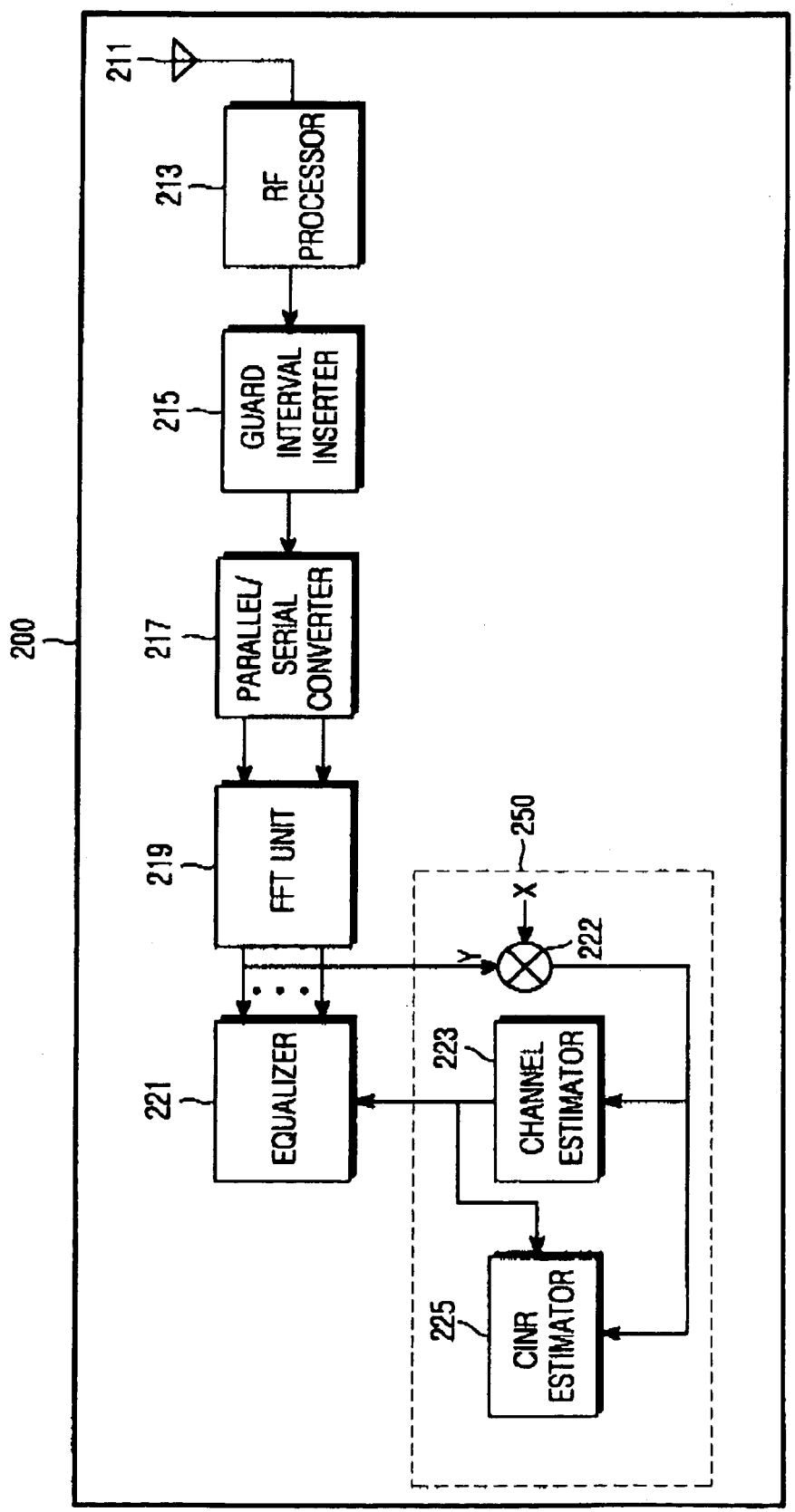
FIG. 2 is a block diagram illustrating a conventional OFDM receiver.

FIG. 2 is a block diagram illustrating a conventional OFDM receiver 200 including a conventional CINR estimation apparatus 250. Referring to FIG. 2, in addition to the CINR estimation apparatus 250, the OFDM receiver 200 includes an antenna 211, an RF processor 213, a guard interval remover 215, a serial/parallel converter 217, an FFT unit 219, and an equalizer 221. The RF processor 213 receives channel data that is transmitted from a wireless channel through the antenna 211 and outputs the channel data to the guard interval remover 215. Upon receiving the channel data, the guard interval remover 215 removes guard intervals from the channel data. The serial/parallel converter 217 converts serial information data and redundant data, in which the guard intervals have been removed, into parallel data and outputs the parallel data to the FIT unit 219. The FFT unit 219 performs fast Fourier transform with respect to the parallel information data and redundant data and outputs Fourier transform data.

The equalizer 221 prevents the Fourier transform information data and redundant data from being distorted by a channel and outputs data having no signal distortion. The channel estimation apparatus 250 calculates channel pass data by multiplying output data of the FFT unit 219 by predetermined sequence and calculates a channel estimation value by estimating a channel status through a SAW channel estimation method. In addition, the channel estimation apparatus 250 calculates a CINR estimation value using the channel pass data and the channel estimation value.

Figure 3:
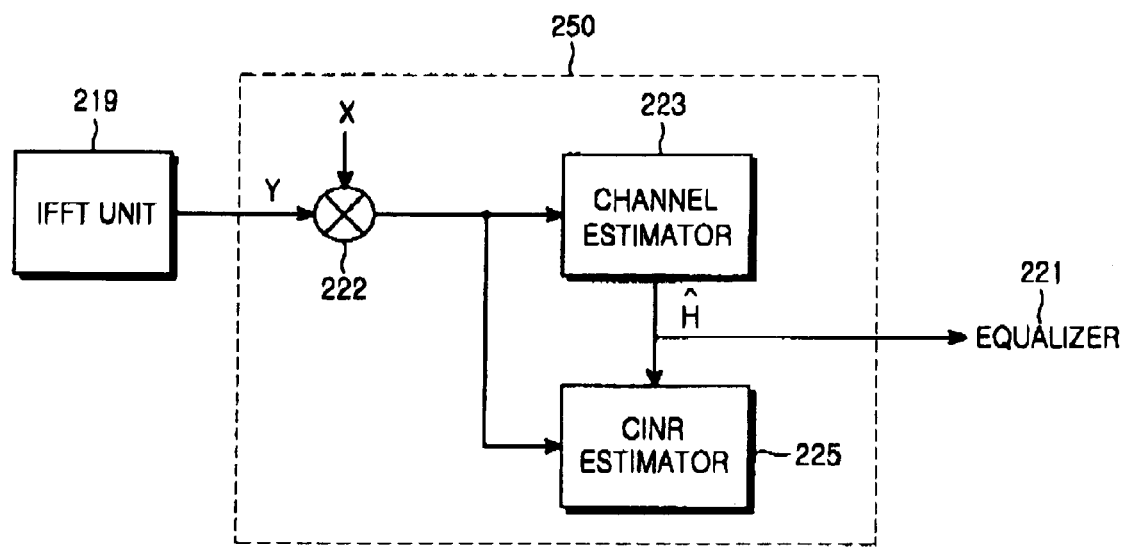
FIG. 3 is a block diagram illustrating a conventional CINR estimation apparatus.

FIG. 3 is a block diagram illustrating the CINR estimation apparatus 250. Referring to FIG. 3, the CINR estimation apparatus 250 includes a channel pass device 222, a channel estimator 223, and a CINR estimator 225. The channel pass device 222 calculates the channel pass data by multiplying the output data of the FFT unit 219 by predetermined sequence, such as pseudo noise or a sequence having orthogonality. The channel pass device 222 calculates the channel pass data through dividing the output data of the FFT unit 219 by predetermined sequence. Because channel pass data has a value of 1 or −1, either multiplication or division can be used to calculate the channel pass data. The output signal of the FFT unit 219 can be defined as a point on a complex plane as represented in Equation (1).

$$y_k = H_k x_k + n_k \quad (1)$$

In Equation (1), $y_k$ is a $k^{th}$ output signal of the FFT unit 219, that is, a signal having an interference signal mixed with noise received in a $k^{th}$ sub-carrier, $H_k$ is a channel value (Fourier transform data from the FFT unit 219) corresponding to the $k^{th}$ sub-carrier, $x_k$ is a sequence value (BPSK signal represented as 1 or −1) transmitted to the $k^{th}$ sub-carrier, and $n_k$ is a sum of a noise and the interference signal included in the $k^{th}$ sub-carrier. The channel pass device 22 calculates $y_k x_k$, which is $k^{th}$ channel pass data, by multiplying $y_k$, which is the $k^{th}$ output signal of the FFT unit 219, by the sequence value received in the $k^{th}$ sub-carrier.

The channel estimator 223 calculates a SAW channel estimation value ($\hat{H}_k$) by using the SAW channel estimation method in order to estimate the channel status, which varies according to distortion of a phase and an amplitude of a signal on a frequency domain derived from channel degradation occurring when the signal is transmitted or received. According to the SAW channel estimation method, all of channel pass data output from the channel pass device is added to each other through an average window and the sum of channel pass data is divided by an average window size, thereby estimating the channel. If the average window size is 2W+1, the SAW channel estimation value ($\hat{H}_k$) satisfies Equation (2).

$$\hat{H}_k = \frac{1}{2W+1} \sum_{m=k-W}^{k+W} x_k y_k \qquad (2)$$

That is, the SAW channel estimation value ($\hat{H}_k$) is an average of the channel pass data, which is obtained by multiplying the signal $y_k$ received in the W-number of sub-carriers, which are aligned at left and right positions of the $k^{th}$ sub-carrier, by the sequence value $x_k$ corresponding to the signal $y_k$. The above SAW channel estimation value ($\hat{H}_k$) can be obtained because there is a physical characteristic in that a channel value of the $k^{th}$ sub-carrier and a channel value, Hm(m=k−W . . . , k+W), are almost same, when W has a value smaller than frequency selectivity of a channel. In addition, there is a physical characteristic that if W has a large value, noise and interference signals are distributed according to Gaussian distribution having an average of 0. Accordingly, noise can be offset by the interference signals, if the SAW channel estimation value is obtained by averaging the channel pass data. With the error floor phenomenon, that is, in order for the first assumption, i.e., the adjacent sub-carriers experience the same channel, to hold, the window size must be small. However, for the second assumption, i.e., the interference and noise have a Gaussian distribution with zero mean, to hold, the window size must be large. Therefore, the window size must have a value that is neither too small nor too large.

If the $W_l$-number of sub-carriers and the $W_r$-number of sub-carriers are aligned at left and right positions of the $k^{th}$ sub-carrier, respectively, Equation (2) can be replaced with Equation (2a).

$$\hat{H}_k = \frac{1}{W_l + W_r + 1} \sum_{m=k-W_l}^{k+W_r} x_k y_k \qquad (2a)$$

The CINR estimator 225 calculates the CINR estimation value, which is obtained by dividing the sum of signal power of sub-carriers by the sum of noise and interference signals. Accordingly, a CINR value can be obtained using Equation (3).

$$CINR = \frac{\sum_{k=1}^{N} |H_k x_k|^2}{\sum_{k=1}^{N} |y_k - H_k x_k|^2} \qquad (3)$$

Because $x_k$ is a BPSK signal represented as 1 or −1, the CINR value can be obtained according to Equation (4).

$$CINR_{old} = \frac{\sum_{k=1}^{N} |\hat{H}_k|^2}{\sum_{k=1}^{N} |x_k y_k - \hat{H}_k|^2} \qquad (4)$$

Referring to Equation 4, when the channel is estimated using the SAW, power is defined by a square value of an absolute value of a SAW channel estimation value. Accordingly, total signal power is represented as a sum of square values of absolute values of SAW channel estimation values. In addition, if the SAW channel estimation value is subtracted from the receiving signal of each sub-carrier, only noise and an interference signal remain. Therefore, a sum of noise and interference power is represented as a sum of square values of absolute values of noise and interference values.

The CINR estimator 225 calculates the CINR estimation value by dividing the sum of square values of absolute values of SAW channel estimation values by the sum of noise and interference power as represented in Equation (4).

Herein, it is noted that the SAW channel estimation values are inaccurate values. Therefore, if the CINR estimation value is obtained using the inaccurate SAW channel estimation value, the CINR estimation value may be represented higher than a real CINR value, which is called an "error floor phenomenon". The error floor phenomenon may occur because the inaccurate SAW channel estimation value is used instead of a real channel value. Therefore, according to an embodiment of the present invention, the CINR estimation value is obtained by performing an inverse calculation based on the real channel value, instead of using the inaccurate SAW channel estimation value. Consequently, the error floor phenomenon can be prevented.

Hereinafter, a procedure of the inverse calculation for the CINR estimation value based on the real channel value, instead of using the inaccurate SAW channel estimation value, will be explained with reference to Equation (4).

Referring to Equation (4), a denominator can be shown in Equation (4a)

$$\sum_{k=1}^{N} |x_k y_k - \hat{H}_k|^2 = \sum_{k=1}^{N} \left| x_k y_k - \frac{1}{2W+1} \sum_{m=k-W}^{k+W} x_m y_m \right|^2 = \qquad (4a)$$

$$\frac{1}{(2W+1)^2} \sum_{k=1}^{N} \left| 2W x_k y_k - \sum_{m=1}^{k+W} x_m y_m - \sum_{m=k-W}^{-1} x_m y_m \right|^2 =$$

$$\frac{1}{(2W+1)^2}$$

-continued $$\sum_{k=1}^{N}\left|2WH_k + 2Wx_kn_k - \sum_{m=1}^{k+W}(H_m + x_mn_m) - \sum_{m=k-W}^{-1}(H_m + x_mn_m)\right|^2$$

$$\cong \frac{1}{(2W+1)^2}$$

$$\sum_{k=1}^{N}\left|2Wx_kn_k - \sum_{m=1}^{k+W}x_mn_m - \sum_{m=k-W}^{-1}x_mn_m\right|^2 =$$

$$\frac{4W^2 + 2W}{(2W+1)^2}\sum_{k=1}^{N}|n_k|^2$$

Equation (4a) is a calculation formula to substitute Equation (2) for the denominator of Equation (4).

Equation (4) uses the physical characteristic that a channel value $H_k$ is substantially identical a channel value $Hm(m=k-W, \ldots, k+W)$ of adjacent sub-carriers. In addition, although a value of the noise and interference signal $n_k$ is not defined when k is less than 1 or k exceeds N, the value of the noise and interference signal $n_k$ is disregarded if N is larger than k because the value of the noise and interference signal $n_k$ may be very small.

In addition, referring to Equation (4), a numerator can be shown in Equation (4b)

$$\sum_{k=1}^{N}\left|\frac{1}{2W+1}\sum_{m=k-W}^{k+W}x_my_m\right|^2 = \qquad (4b)$$

$$\sum_{k=1}^{N}\left|\frac{1}{2W+1}\sum_{m=k-W}^{k+W}(H_m + x_mn_m)\right|^2 \cong \sum_{k=1}^{N}|H_k|^2 +$$

$$\frac{1}{(2W+1)^2}\sum_{k=1}^{N}\left|\sum_{m=k-W}^{k+W}x_mn_m\right|^2 = \sum_{k=1}^{N}|H_k|^2 + \frac{1}{2W+1}\sum_{k=1}^{N}|n_k|^2$$

Equation (4b) is a calculation formula to substitute Equation (2) for the numerator of Equation (4).

Thus, an error function of the CINR estimation value can be obtained using the denominator and numerator of the CINR estimation value as represented in Equation (5).

$$CINR_{old} = \frac{(2W+1)^2}{4W^2 + 2W}CINR + \frac{2W+1}{4W^2 + 2W} \qquad (5)$$

In Equation (5), $CINR_{old}$ is an estimation value obtained using Equation (4), which may cause the error floor phenomenon because of an inaccurate SAW estimation value, and CINR (hereinafter, referred to as "$CINR_{est,new}$") is a CINR estimation value that does not cause the error the error floor phenomenon.

If the $W_l$-number of sub-carriers and the $W_r$-number of sub-carriers are aligned at left and right positions of the $k^{th}$ sub-carrier, respectively, Equation (5) can be replaced with Equation (5a).

$$CINR_{old} = \frac{(W_l + W_r + 1)^2}{(W_l + W)^2 + W_l + W_r}CINR + \frac{W_l + W_r + 1}{(W_l + W)^2 + W_l + W_r} \qquad (5a)$$

The CINR estimation value ($CINR_{est,new}$) can be obtained as shown Equation (6), which is based on Equation (5).

$$CINR_{est,new} = \frac{4W^2 + 2W}{(2W+1)^2}CINR_{old} - \frac{1}{2W+1} \qquad (6)$$

Therefore, the CINR estimation apparatus according to the present invention can calculate an accurate CINR estimation value based on the SAW channel estimation value and the error function as shown in Equation 6, by removing the error floor derived from the inaccurate SAW channel estimation value from the CINR estimation value.

If the $W_l$-number of sub-carriers and the $W_r$-number of sub-carriers are aligned at left and right positions of the $k^{th}$ sub-carrier, respectively, Equation (6) can be replaced with Equation (6a).

$$CINR_{est,new} = \frac{(W_l + W_r)^2 + W_l + W_r}{(W_l + W_r + 1)^2}CINR_{old} - \frac{1}{W_l + W_r + 1} \qquad (6a)$$

As shown in Equation (6a), if a size of a window W is sufficiently large, the error floor phenomenon does not occur. However, in practice, when the channel has an inferior frequency selectivity, if the size of the window becomes large, the channel values of adjacent sub-carriers may not be substantially identical to each other. Consequently, there is a limitation for enlarging the size of the window. Therefore, the apparatus for removing the error floor according to the present invention is necessarily required.

Figure 4:
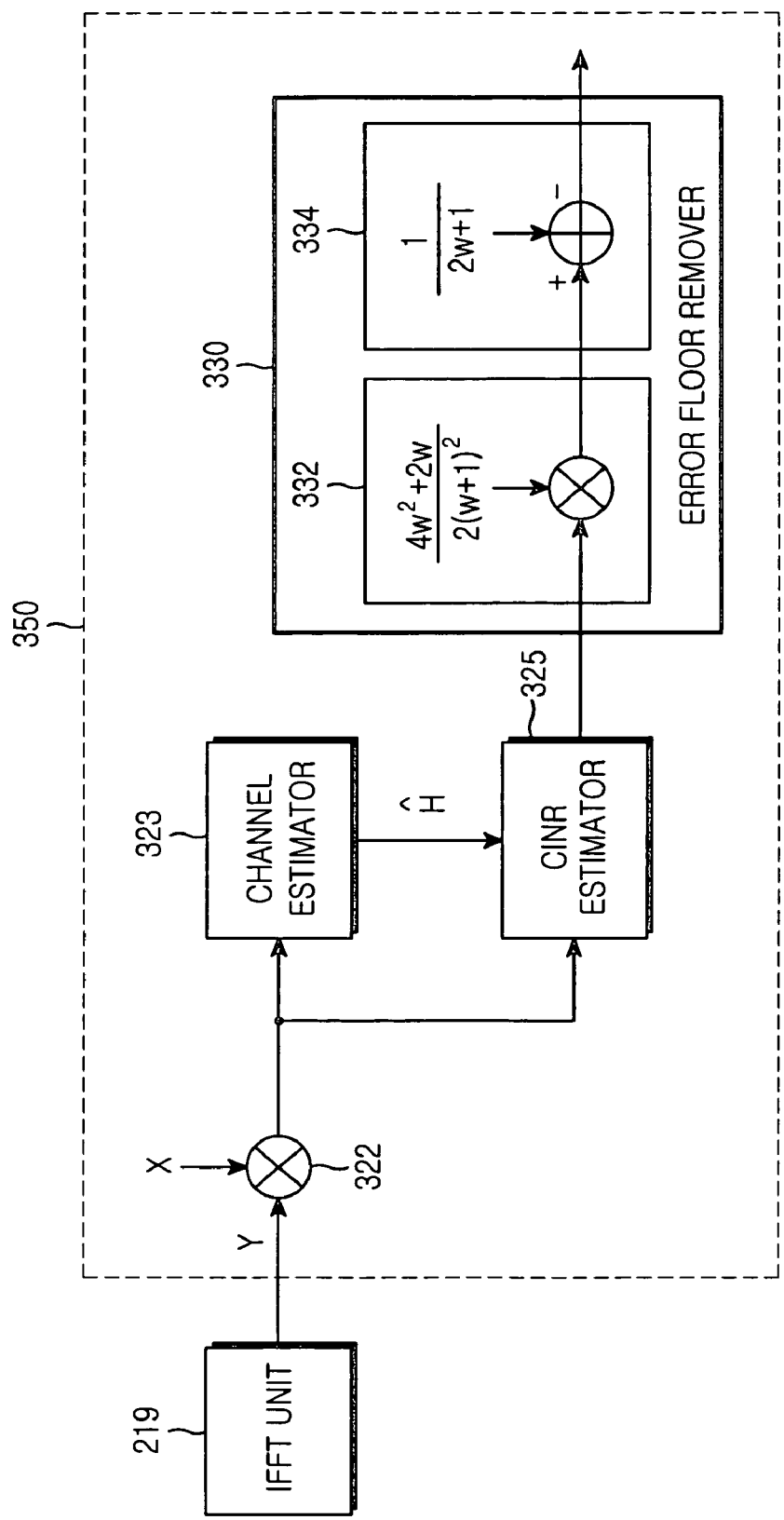
FIG. 4 is a block diagram illustrating a CINR estimation apparatus according to an embodiment of the present invention.

FIG. 4 is a block diagram illustrating a CINR estimation apparatus 350 according to an embodiment of the present invention. Referring to FIG. 4, the CINR estimation apparatus 350 includes a channel pass device 322, a channel estimator 323, a CINR estimator 325, and an error floor remover 330.

The channel pass device 322 calculates channel pass data $y_kx_k$, which is $k^{th}$ channel pass data, by multiplying $y_k$, which is the $k^{th}$ output signal of the FFT unit 219, by the sequence value received in the $k^{th}$ sub-carrier.

The channel estimator 323 calculates a SAW channel estimation value ($\hat{H}_k$) using the SAW channel estimation method. If an average window size is 2W+1, SAW channel estimation value ($\hat{H}_k$) may satisfy Equation (2).

The CINR estimator 325 can calculate the CINR estimation value as represented in Equation (4) using $x_k$, which is a BPSK signal represented as 1 or −1.

The error floor remover 330 removes the error floor, which is derived from the inaccurate SAW channel estimation value, from the accurate CINR estimation value, which is obtained based on the SAW channel estimation value and the error function as shown in Equation (6).

According to the present invention, the error floor remover 330 includes a first error floor removing section 332 and a second error floor removing section 334. The first error floor removing section 332 removes a first error floor caused by a first-coefficient $(2W+1)^2/(4W^2+2W)$ from the error function shown in Equation (5). Further, the first error floor removing section 332 may include a multiplier for multiplying the CINR estimation value by a coefficient $(4W^2+2W)/(2W+1)^2$. The second error floor removing section 334 removes a second error floor caused by a zero-coefficient $(2W+1)/(4W^2+2W)$ from the error function shown in Equation (5). The second error floor removing section 334 may include a subtractor for subtracting $1/(2W+1)$ from an output value of the first floor removing section 332.

Figure 5:
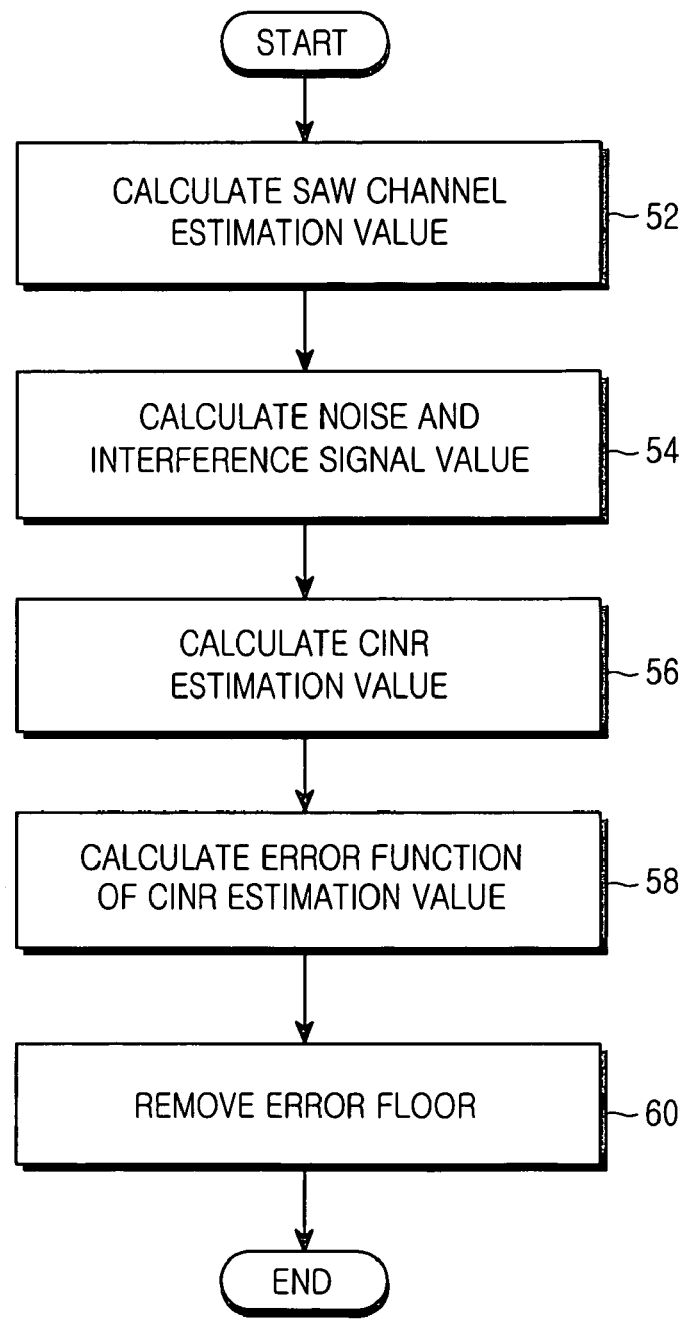
FIG. 5 is a flowchart illustrating a procedure of CINR estimation according to an embodiment of the present invention.

FIG. 5 is a flowchart illustrating a procedure of CINR estimation according to an embodiment of the present invention. Referring to FIG. 5, the CINR estimation apparatus 350 calculates the SAW channel estimation value (H) using the SAW channel estimation method in step 52. That is, the CINR estimation apparatus 350 sums up channel pass data output from the channel pass device through an average window and the sum of channel pass data is divided by an average window size, thereby calculating the SAW channel estimation value. In addition, the CINR estimation apparatus 350 subtracts the SAW channel estimation value from each channel pass signal, thereby obtaining the noise and interference value in step 54. If the SAW channel estimation value is subtracted from a receiving signal of each sub-carrier, only the noise and interference signal remain.

After obtaining the SAW channel estimation value and the noise and interference value, the CINR estimation apparatus 350 calculates total signal power using the SAW channel estimation value and calculates total noise and interference power using the noise and interference value, in order to obtain the CINR estimation value in step 56. Because power is a square value of an absolute value of the SAW channel estimation value, the total power is a sum of square values of absolute values of the SAW channel estimation values. In addition, because only the noise and interference signal remain when the SAW channel estimation value is subtracted from the receiving signal of each sub-carrier, a sum of noise and interference power is a sum of square values of absolute values of noise and interference values. Accordingly, the CINR estimator 325 calculates the CINR estimation value by dividing the sum of square values of absolute values of the SAW channel estimation values by the sum of noise and interference power as represented in Equation (4).

After calculating the CINR estimation value, the CINR estimation apparatus 350 calculates the error function of the CINR estimation value by performing an inverse calculation for the CINR estimation value, based on the real channel pass value, instead of using the inaccurate SAW channel estimation value, in step 58. The error function of the CINR estimation value is represented in Equation (5).

Thereafter, the CINR estimation apparatus 350 calculates the coefficient of the error function of the CINR estimation value and removes the error floor caused by the coefficient of the error function from the CINR estimation value in step 60.

As described above, according the apparatus and the method of the present invention, the error floor value caused by the inaccurate SAW channel estimation value is removed from the CINR estimation value, such the CINR estimation apparatus 350 of the present invention can precisely calculate the CINR estimation value, as compared with the conventional CINR estimation apparatus 250, which cannot.

Figure 6:
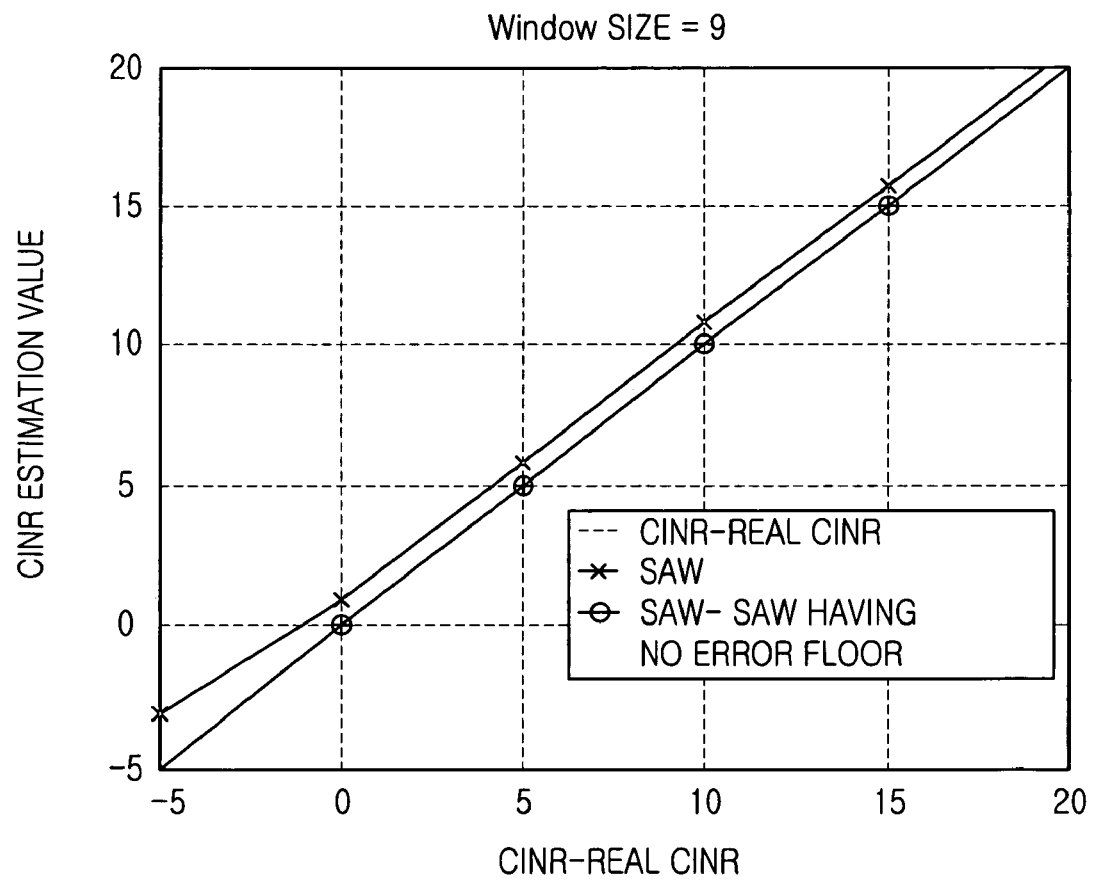
FIG. 6 is a graph illustrating CINR estimation values obtained through a conventional CINR apparatus and a CINR estimation apparatus according an embodiment of the present invention, respectively.

FIG. 6 is a graph illustrating CINR estimation values obtained through the conventional CINR apparatus 250 and the CINR estimation apparatus 350 according an embodiment of the present invention, respectively. More specifically, FIG. 6 illustrates the CINR estimation values obtained through the conventional CINR apparatus 250 and the CINR estimation apparatus 350 when the average widow size (2W+1) is 9, that is, W is 4. In FIG. 6, an x-axis represents real CINR values and a y-axis represents CINR estimation values.

It is understood from FIG. 6 that the CINR estimation values are substantially the same as the real CINR values when the error floor has been removed from the CINR estimation values. The embodiment of the present invention is described only by a SAW channel estimation method, but it can be applied to all of channel estimation methods similar to the SAW channel estimation method.

As described above, according to the present invention, the CINR value can be precisely estimated by removing the error floor value, which is caused by the inaccurate SAW channel estimation value, from the CINR estimation value.

In addition, because the CINR value can be precisely estimated, performance of the adaptive power control or the adaptive modulation and coding device can be improved.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A Carrier to Interference and Noise Ratio (CINR) estimation apparatus for use in a communication system, the CINR apparatus comprising:
    a channel pass device for generating channel pass signals by multiplying receiving signals by a predetermined sequence value, and outputting the channel pass signals;
    a channel estimator for calculating Sliding Average Window (SAW) channel estimation values using a SAW channel estimation method based on the channel pass signals;
    a CINR estimator for obtaining total signal power using the SAW channel estimation values, obtaining total noise and interference power using noise and interference signal values, which are obtained by subtracting the SAW estimation values from the channel pass signals, and calculating CINR estimation values using the total signal power and the total noise and interference power; and
    an error floor remover for calculating an error function of the CINR estimation values by performing an inverse calculation for the CINR estimation values based on real channel pass signal values and removing an error floor caused by the error function of the CINR estimation values from the CINR estimation values calculated by the CINR estimator.

2. The CINR apparatus as claimed in claim 1, wherein the CINR estimation values are obtained by dividing the total signal power by the total noise and interference power.

3. The CINR apparatus as claimed in claim 1, wherein the error function of the CINR estimation value satisfies:

$$CINR_{est,new} = \frac{(W_l + W_r)^2 + W_l + W_r}{(W_l + W_r + 1)^2} CINR_{old} - \frac{1}{W_l + W_r + 1}$$

wherein, $CINR_{old}$ represents a CINR estimation value obtained by using the SAW channel estimation value, $CINR_{est,new}$ represents a CINR estimation value, which does not cause an error floor, and $W_l$ and $W_r$ represent sub-carriers aligned on left and right sides of a signal.

4. The CINR apparatus as claimed in claim 1, wherein the error floor remover comprises a first error floor removing unit for removing a first error floor caused by a first-coefficient of the error function.

5. The CINR apparatus as claimed in claim 4, wherein the error floor remover comprises a second error floor removing unit for removing a second error floor caused by a zero-coefficient of the error function.

6. The CINR apparatus as claimed in claim 5, wherein the second error floor removing unit comprises a subtractor for subtracting $1/(W_l+W_r+1)$ from the CINR estimation value, in which the first error floor is removed, in order to remove the second error floor caused by the zero-coefficient of the error function of the CINR estimation value, wherein $W_l$ and $W_r$ represent sub-carriers aligned on left and right sides of a signal.

7. The CINR apparatus as claimed in claim 4, wherein the first error floor removing unit comprises a multiplier for multiplying the CINR estimation value by $\{(W_l+W_r)^2+W_l+W_r\}/(W_l+W_r+1)^2$ in order to remove the first error floor caused by the first-coefficient of the error function of the CINR estimation value, wherein $W_l$ and $W_r$ represent sub-carriers aligned on left and right sides of a signal.

8. A method for estimating a Carrier to Interference and Noise Ratio (CINR), in a mobile communication system, the method comprising the steps of:

calculating, by a channel estimator, Sliding Average Window (SAW) channel estimation values using a SAW channel estimation method based on channel pass signals obtained by multiplying receiving signals by a pre-determined sequence value;

calculating, by a CINR estimator noise and interference signal values by subtracting the SAW estimation values from the channel pass signals;

obtaining, by the CINR estimator, a total signal power using the SAW channel estimation values;

obtaining, by the CINR estimator, a total noise and interference power using the noise and interference signal values;

calculating, by the CINR estimator, CINR estimation values using the total signal power and the total noise and interference power;

calculating, by an error floor remover, an error function of the CINR estimation values by performing an inverse calculation for the CINR estimation values based on real channel pass signal values; and removing an error floor, which is caused by the error function of the CINR estimation values, from the CINR estimation values.

9. The method as claimed in claim 8, wherein the step of calculating the CINR estimation values comprises dividing the total signal power by the total noise and interference power.

10. The method as claimed in claim 9, wherein the error function of the CINR estimation value satisfies:

$$CINR_{est,new} = \frac{(W_l + W_r)^2 + W_l + W_r}{(W_l + W_r + 1)^2} CINR_{old} - \frac{1}{W_l + W_r + 1}$$

wherein, $CINR_{old}$ represents a CINR estimation value obtained using the SAW channel estimation value, $CINR_{est,new}$ represents a CINR estimation value, which does not cause the error floor, and $W_l$ and $W_r$ represent sub-carriers aligned on left and right sides of a signal.

11. The method as claimed in claim 8, wherein the step of removing the error floor comprises removing a first error floor caused by a first-coefficient of the error function.

12. The method as claimed in claim 11, wherein the step of removing the error floor further comprises removing a second error floor caused by a zero-coefficient of the error function.

13. The method as claimed in claim 12, wherein the step of removing the second error floor comprises:

subtracting $1/(W_l+W_r+1)$ from the CINR estimation value, in which the first error floor is removed, in order to remove the second error floor caused by the zero-coefficient of the error function of the CINR estimation value, wherein $W_l$ and $W_r$ represent sub-carriers aligned on left and right sides of a signal.

14. The method as claimed in claim 11, wherein the step of removing the first error floor comprises:

multiplying the CINR estimation value by $\{(W_l+W_r)^2+W_l+W_r\}/(W_l+W_r+1)^2$ in order to remove the first error floor caused by the first-coefficient of the error function of the CINR estimation value, wherein $W_l$ and $W_r$ represent sub-carriers aligned on left and right sides of a signal.

* * * * *

UNITED STATES PATENT AND TRADEMARK OFFICE
CERTIFICATE OF CORRECTION

PATENT NO.       : 7,580,487 B2                                        Page 1 of 1
APPLICATION NO. : 11/120254
DATED            : August 25, 2009
INVENTOR(S)      : Chang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1117 days.

Signed and Sealed this

Fourteenth Day of September, 2010

David J. Kappos
*Director of the United States Patent and Trademark Office*